United States Patent [19]
Kim

[11] Patent Number: 6,040,872
[45] Date of Patent: *Mar. 21, 2000

[54] COMMUNICATION CONTROL DEVICE AND METHOD FOR TELEVISION RECEIVER

[75] Inventor: Hak Lyang Kim, Taegu, Rep. of Korea

[73] Assignee: LG Electronics, Inc., Seoul, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/549,560

[22] Filed: Oct. 27, 1995

[30] Foreign Application Priority Data

Oct. 28, 1994 [KR] Rep. of Korea ...................... 94-27986
Dec. 28, 1994 [KR] Rep. of Korea ...................... 94-37803

[51] Int. Cl.[7] .............................. H04N 7/00; H04N 7/10
[52] U.S. Cl. ........................... 348/553; 348/10; 348/554; 348/552; 348/446; 455/5.1
[58] Field of Search ................................... 348/10, 7, 12, 348/13, 16, 17, 552, 465, 705, 706, 554, 555, 553, 731, 446; 455/5.1; 345/115, 2, 1; H04N 7/00, 7/10

[56] References Cited

U.S. PATENT DOCUMENTS

| | | | |
|---|---|---|---|
| 4,091,424 | 5/1978 | Widergren | 358/433 |
| 4,456,925 | 6/1984 | Skerlos et al. | 348/552 |
| 4,599,611 | 7/1986 | Bowker et al. | 348/552 |
| 5,089,811 | 2/1992 | Leach | 348/552 |
| 5,192,999 | 3/1993 | Graczyk et al. | 348/552 |
| 5,220,420 | 6/1993 | Hoarty et al. | 455/5.1 |
| 5,389,976 | 2/1995 | Miyagawa et al. | 348/552 |
| 5,414,773 | 5/1995 | Handelman | 348/10 |
| 5,561,709 | 10/1996 | Remillard | 348/552 |
| 5,592,233 | 1/1997 | Koz | 348/552 |
| 5,815,208 | 9/1998 | Samlea et al. | 348/446 |

OTHER PUBLICATIONS

Jack, Keith, "Video Demystified—A Handbook for the Digital Engineer," HighText Publications Inc., Solana Beach, CA, ©1993 By Brooktree Corporation, pp. 409, 417, 418.

Primary Examiner—John K. Peng
Assistant Examiner—Linus H. Lo
Attorney, Agent, or Firm—Fish & Richardson P.C.

[57] ABSTRACT

A communication control device and method which can perform communication tasks such as computer communication, facsimile transmission and reception utilizing a television receiver. A user can select one of a television mode, a computer communication mode, and a facsimile mode by means of a television/communication switching section, thereby enjoying multifunction with the television receiver. The device includes an image interface section for performing interlaced scanning suitable for television screen display. The user may enjoy computer communication and facsimile transmission and reception as well as television function by means of a remote controller and a keyboard. The facsimile data may be recorded or reproduced by an external video recording/reproducing apparatus.

4 Claims, 7 Drawing Sheets

COMMUNICATION CONTROL DEVICE AND METHOD FOR TELEVISION RECEIVER

BACKGROUND OF THE INVENTION

1. Field of the Invention

The present invention relates to a communication control device and method for a television receiver which can perform communication tasks such as computer communication, facsimile transmission and reception utilizing the television receiver. More particularly, the present invention relates to a communication control device and method for a television receiver which enables the use of commercial computer communication services and facsimile transmission/reception by employing a modem (modulator-demodulator), a television image processing unit and a communication image processing unit.

2. Description of the Prior Art

Conventionally, computer communication or facsimile transmission/reception can be performed by its own dedicated machine. For instance, computer communication has been performed by a personal computer, while facsimile transmission/reception has been performed by a facsimile machine.

FIG. 1 is a block diagram of a conventional personal computer having a computer communication function. Referring to FIG. 1, the conventional personal computer is provided with a modem 1 for transmitting/receiving data through a telephone line, a computer 2 for processing and storing the data transmitted/received from the modem 1, and a monitor 3 for displaying the data processed by the computer 2.

The operation of the conventional personal computer as constructed above will now be explained.

If a user connects the computer 2 to a data base of a communication service via the modem 1 to enjoy the communication service, various pieces of information stored in the data base are inputted to the computer 2. The computer 2 processes and displays the input information on the monitor 3 for the user's recognition.

Consequently, at a minimum, a personal computer and a dedicated terminal device as well as an equipment for using the communication service are required to enjoy the communication service.

FIG. 2 is a block diagram of a conventional facsimile machine. Referring to FIG. 2, the conventional facsimile machine comprises an image input section 111 for photoelectrically reading an original document to be transmitted and outputting the result in the form of digital image data, an image processing section 112 for processing the image data from the image input section 111, a memory 113 for storing the data processed by the image processing section 112 or restored data in the following stage, a data compression/decompression section 115 for compressing the transmitted data stored in the memory 113 and decompressing received data, a modem 116 for transmitting/receiving compressed data through a telephone line, an image output section 114 for reading out the received data stored in the memory 113 and outputting the read-out data for printing, and a processor 117 for controlling the operation of each section to perform facsimile transmission/reception.

The operation of the conventional facsimile machine as constructed above will be explained.

If a user inputs a document to be transmitted to the image input section 111, the section 111 photoelectrically reads the document and outputs the result in the form of digital image data to the image processing section 112, allowing the image processing section 112 to store the image data in the memory 113. The data compression/decompression section 115 compresses the data stored in the memory 113 for transmission and outputs the compressed data to the modem 116. The modem 116 then transmits the data to another facsimile machine through the telephone line.

If the transmitted data is received to the modem 116 of another facsimile machine, the modem 116 outputs the received data to the data compression/decompression section 115. The data compression/decompression section 115 decompresses the received data to restore the received data to the original data and stores the decompressed data in the memory 113. Thereafter, the image output section 114 reads out the decompressed data from the memory 113, and prints the read-out data on paper.

The conventional facsimile machine, however, has a drawback in that the user cannot see the contents of the received image data through a screen since the function of the facsimile machine is limited to transmission/reception of a document.

SUMMARY OF THE INVENTION

The present invention has been made to overcome the problems involved in the prior art. It is an object of the present invention to provide a communication control device and method for a television receiver(TV) which can connect the TV to a commercial computer communication service such as "Internet" and display communication service information on a television screen.

It is another object of the present invention to provide a communication control device and method for a TV which can perform facsimile transmission/reception and display received facsimile data on the television screen.

In one aspect of the present invention, there is provided a communication control device for a TV which comprises:

television/communication switching means for selection one of an image signal of a television broadcasting channel and an image signal for computer communication;

key input means for manually inputting a key signal for performing computer communication;

control means for controlling the operation of said television/communication switching means and controlling transmission and reception for computer communication in accordance with the key signal from said key input means;

a modem, connected to an external communication line, for modulating and demodulation communication information to be transmitted and received;

data memory means for storing the communication data being inputted through said modem and outputting the stored communication data under the control of said control means; and image interface means for converting the communication data received through said modem or the data stored in said data memory means into a television image signal under the control of said control means, and outputting the television image signal to a television screen through said television/communication switching means.

Preferably, the communication control device according to the present invention further comprises:

data compression/decompression means, connected to said modem for decompressing the data received in a facsimile data format or compressing the data to be transmitted in the facsimile data format; and facsimile/communication switching means for switching said data compression/decompression means according to a facsimile transmission and reception mode or a computer communication mode under the control of said control means.

In another aspect of the present invention, there is provided a communication control method for a TV which comprises the steps of:

determining whether the present mode is a television mode or a communication mode;

performing a television signal receiving function if it is determined that the present mode is the television mode at the present mode determining step; and performing data transmission and reception through a communication modem and display of received data on a screen if it is determined that the present mode is the communication mode at the present mode determining step.

It is preferable that the communication control method according to the present invention further comprises the steps of:

whether or not the present mode is a facsimile communication mode;

receiving facsimile data and display the received data on the screen if it is determined that the present mode is the facsimile communication mode; and compressing the facsimile data to be transmitted in a transmission format and transmitting the compressed facsimile data.

BRIEF DESCRIPTION OF THE DRAWINGS

The above objects and other features of the present invention will be apparent from the following description taken in conjunction with the accompanying drawings, in which.

DETAILED DESCRIPTION OF THE PREFERRED EMBODIMENTS

Hereafter, the organization and control process of a TV, adopting the functions of a computer communication and a facsimile communication according to the present invention, will be described with respect to FIGS. 3 to 8.

Figure 1:
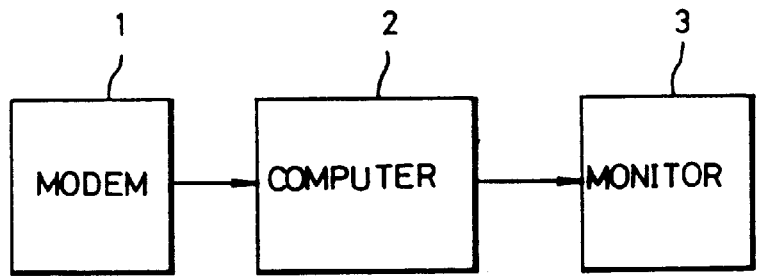
FIG. 1 is a block diagram showing the construction of a conventional personal computer.
Figure 2:
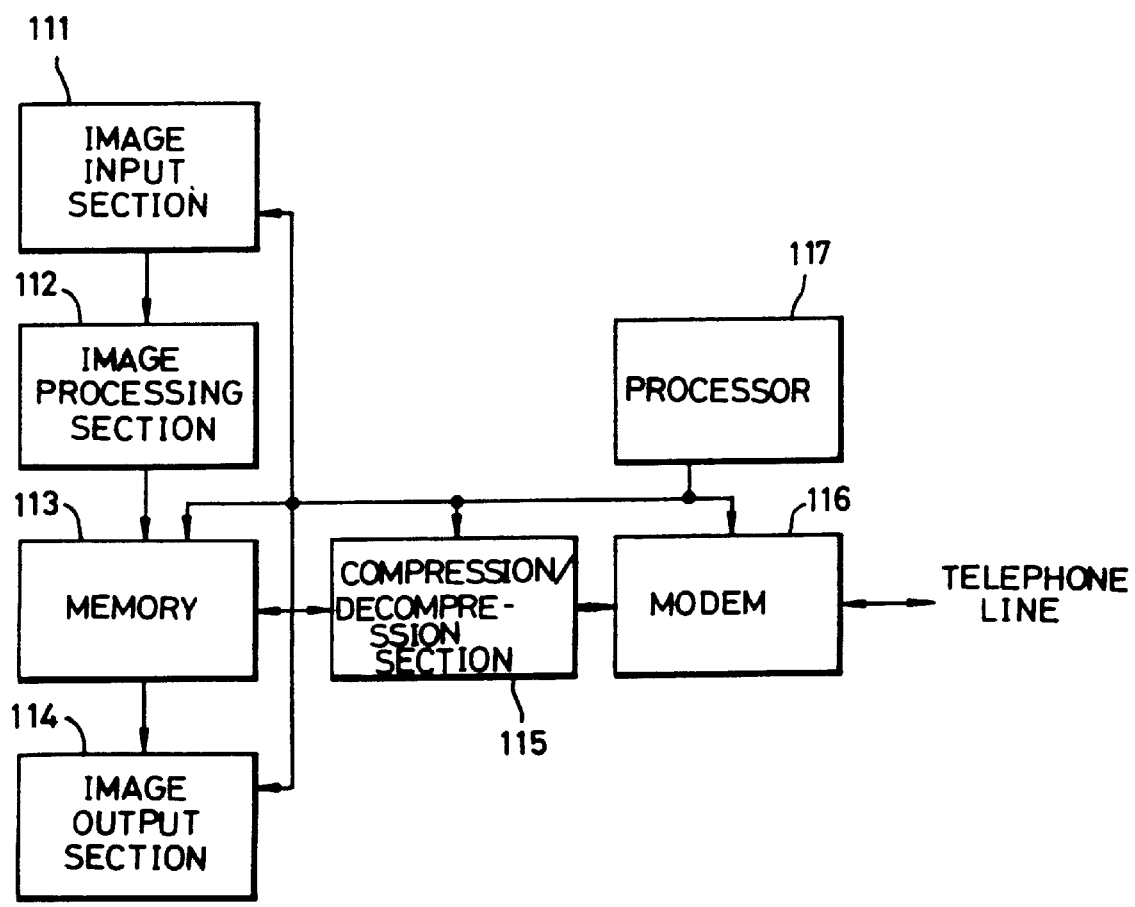
FIG. 2 is a block diagram showing the construction of a conventional facsimile machine.
Figure 3:
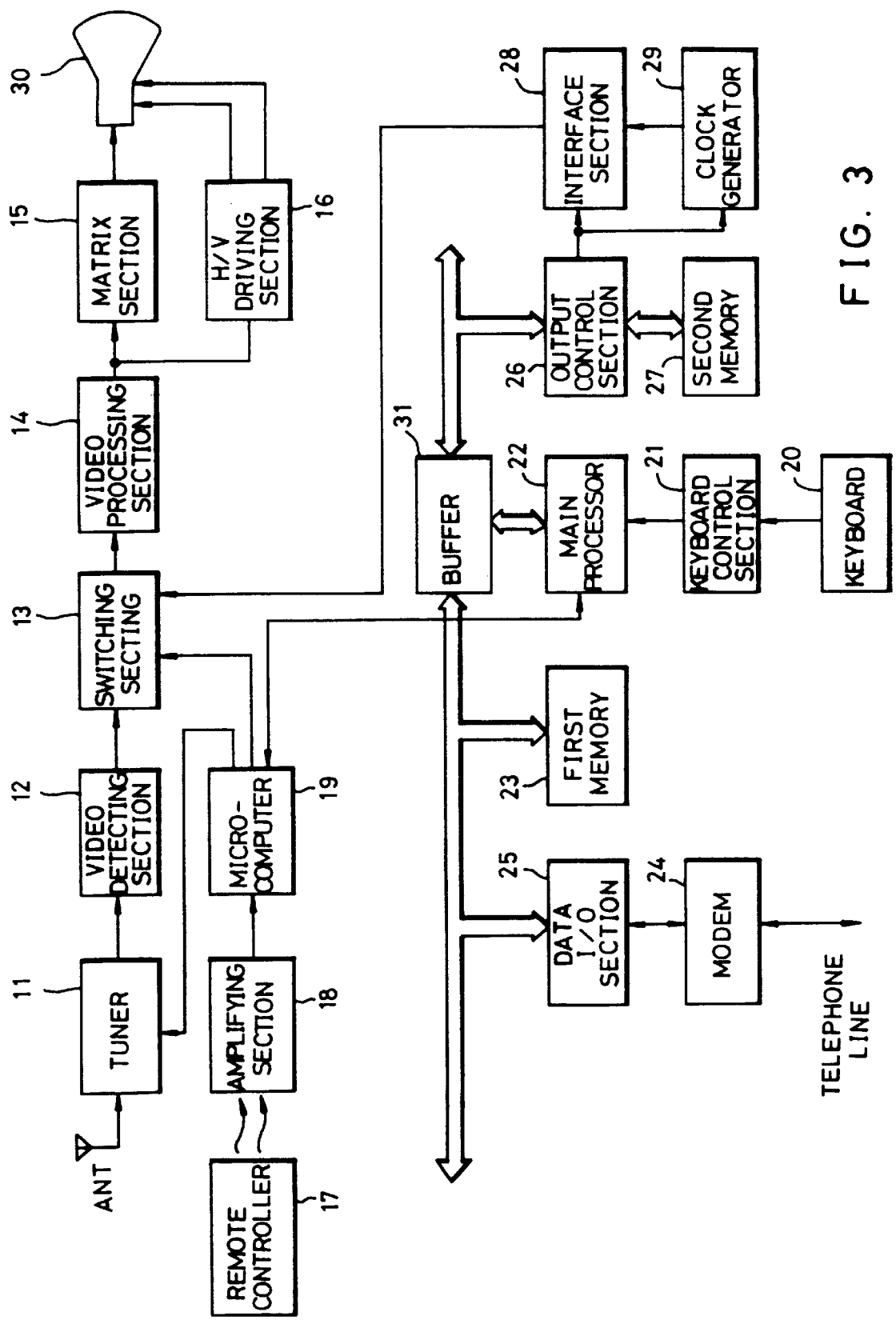
FIG. 3 is a block diagram of a first embodiment of the communication control device for a TV according to the present invention.

FIG. 3 is a block diagram that shows an organization of a communication control device for a TV, according to a first embodiment of the present invention. The organization is as follows: a tuner 11 for selecting a particular station channel from the broadcasting signals received by an antenna; a video detecting section 12 for detecting (extracting) a composite video signal from the radio-frequency signal selected in the tuner 11; a switching section 13 for switching the detected composite video signal and a video signal which is provided from the following video interface section 28, under the control of a microcomputer 19; a video processing section 14 for color demodulating the composite video signal from the switching section 13; a matrix section 15 for transforming the demodulated video signal into a signal which is appropriate to the display of a color picture tube (CRT); a horizontal/vertical (H/V) driving section 16 for providing an H/V drive information to the CPT 30; a remote controller 17 for transmitting a function selection signal according to a user's choosing the various functions of a TV; an amplifying section 18 for amplifying the function selection signal from the remote controller 17; a microcomputer 19 for controlling the tuner 11's channel selection by analyzing the function selection signals from the amplifying section 18, and passing the analyzed function selection signals to a main processor 22; a keyboard 20 with which a user instructs a main processor 20 to control a computer communication via a modem 24; a keyboard control section 21 for converting into ASCII codes the instructions from the keyboard 20, and passing the ASCII-converted codes to a main processor 22; a main processor 22 for controlling the operation of computer communication under the instruction of the keyboard control section 21; a first memory 23 in which a program for a computer communication is stored; a modem 24 for transmitting and receiving data through a telephone line; a data input/output (I/O) section 25 for inputting or outputting data to or from the modem 24; an output control section 26 for transforming into a color signal the data which is appropriate to CPT display, among the data received by the modem 24; a second memory 27 for storing the communication service data from the output control section 26; a video interface section 28 for transforming the output signal from the output control section 26 into a composite video signal; a clock generator 29 for generating a prescribed clock signal into the interface section 28, by analyzing the output signal from the output control section 26; and a CRT 30 for imaging the video signal from the matrix section 15. An unexplained reference numeral 31 denotes a bus control buffer.

In the organization above, the afore-mentioned TV/communication switching means is implemented by the switching section 13 that provides to the video processing section 14 either the output from the video detecting section 12 or the output from the interface section 28, under the control of the microcomputer 19. The key input means is composed of the remote controller 17 and amplifying section 18 that control a TV mode, and the keyboard 20 and the control section 21, both controlling a communication mode. The control means is constituted by the microcomputer 19 that controls the switching section 13, according to TV and communication modes, and the main processor 22 that controls data reception and conversion during a communication mode. The data storage means is constituted by the second memory 27 which is connected to the output control section 26. The video interface means is provided with the output control section 26, the video interface section 28, and the clock generator 29.

The operation of such an organized communication control device according to the first embodiment will be discussed. When a user turns a TV on with the remote controller 17, the tuner 11 selects a particular channel from the broadcasting signals received by an antenna and the video detecting section 12 separates a composite video signal from the selected channel signal and provides it to one input of the switching section 13.

The switching section 13 provides the composite video signal from the video detecting section 12 to the video processing section 14, under the control of the microcomputer 19. The video processing section 14 transforms the inputting composite video signal into a color difference signal, thereafter providing the color difference signal to the matrix section 15. The matrix section 15 converts the inputting color difference signal into a color signal appropriate to CRT display. The H/V driving section 16 detects a horizontal and vertical synchronous signals which are provided from the video processing section 14. The synchronous signals deflect properly electron beams which are scanned onto a screen of the CRT 30, so that the color signal from the matrix section 15 can form an appropriate picture pattern.

If a user manipulates a channel selection key of the remote controller 17 to select another station, the remote controller 17 transmits a signal for changing a station. This channel changing signal is amplified in the amplifying section 18 and provided for the microcomputer 19. According to the channel changing signal, the microcomputer 19 controls the tuner 11 to change the present channel into a channel to which a user want.

On the other hand, if a user presses during TV operation a key for a communication mode, the microcomputer 19 informs the main processor 22 that operation should be changed to a communication mode, and, from then on, the main processor 22 is in charge of controlling a computer communication.

Once operation is changed to a communication mode, a user can reach a communication service provider's database, through a telephone line with a modem. A user enters with the keyboard 20 a service name that he wants and a user name or ID number, and the keyboard control section 21 converts the data into an ASCII code, thereby providing the ASCII-coded data to the main processor 22. The main processor 22 transfers the inputting data to the data I/O section 25, by executing a program which-was previously stored in the first memory 23 and is fetched through the bus buffer 31. The data I/O section 25 transmits through the modem 24 the data transferred from the main processor 22 to a database. Then the database at a provider side analyzes the data coming through a telephone line and, if a user name and ID number meet the registered ones, transmits through a telephone line the user-requested information to a user side. The data I/O section 25 receives the inputting information and passes it through the bus buffer 31 to the output control section 26.

The output control section 26 transforms the service information into a color-difference signal and provides it to the interface section 28. The interface section 28 transforms the color difference signal into a composite video signal appropriate to CRT display, and provides it to one input of the switching section 13, in synchronism with the clock signal from the clock generator 29. The switching section 13 provides the inputting composite video signal to the video processing section 14, according to the control of the microcomputer 19, so the service information which was received by the modem 24 is displayed on the CRT 30.

In case that a user wants to put the information away in memory, he can manipulate the keyboard 20 to command the main processor 22 to store the information in the second memory 27. If necessary, a user can transmit data which is stored in each memory 23 and 27, through the modem 24.

Figure 4:
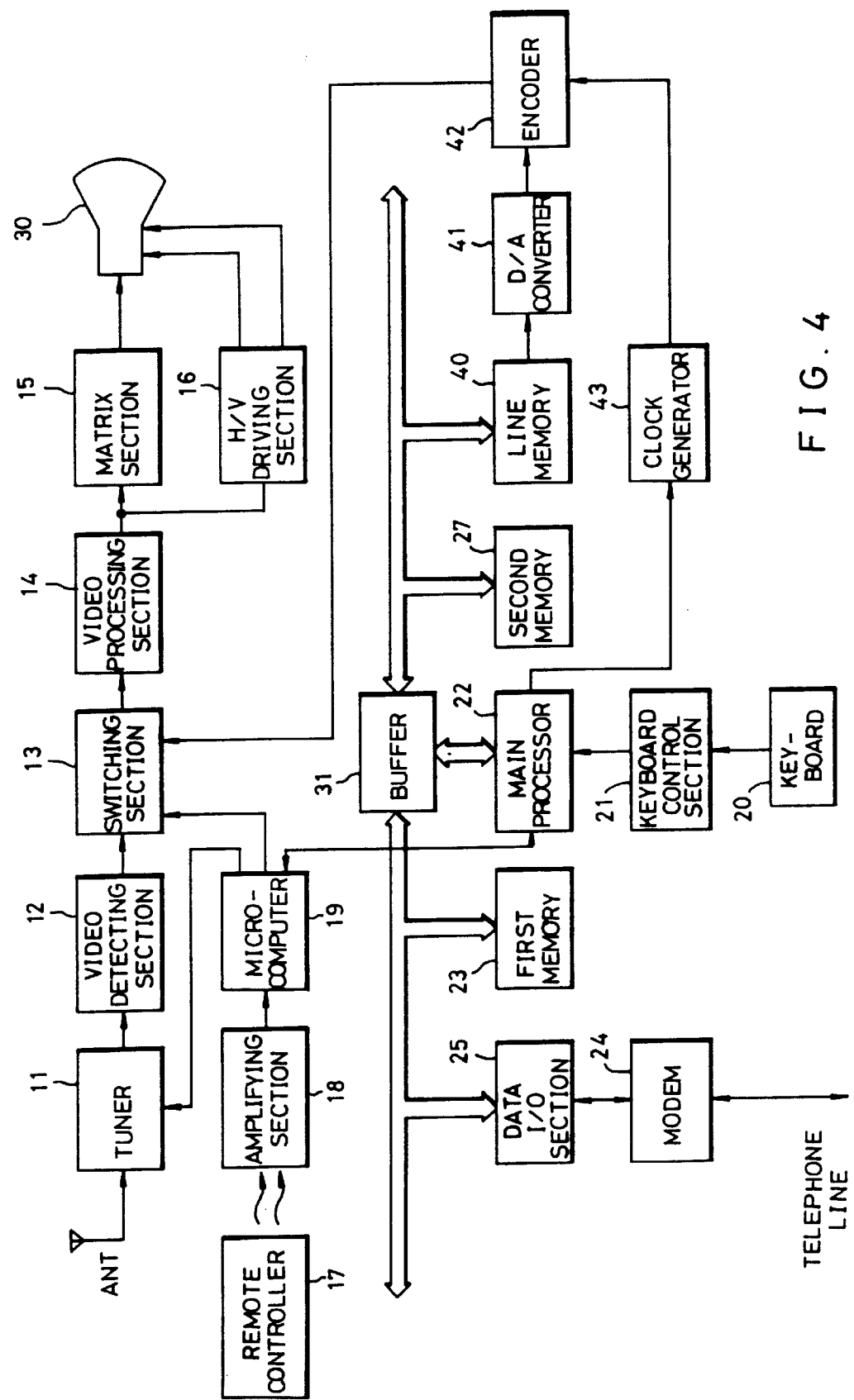
FIG. 4 is a block diagram of a second embodiment of the communication control device for a TV according to the present invention.

FIG. 4 is a block diagram that shows an organization of a communication control device according to a second embodiment of the present invention. The organization of this embodiment has the following difference against the first embodiment in FIG. 3. The afore-mentioned video interface means, which has been comprised in the first embodiment of the output control section 26, the second memory 27, the interface section 28, and the clock generator 29, is provided for this embodiment with a line memory 40 for storing data of frequency f which is received by the modem 24 and outputting data of frequency f/2, under the control of the main processor 22; a digital-to-analog converter 41 for converting the f/2-frequency data into an analog; an encoder 42 for encoding the analog converted data into a composite video signal; and a clock generator 43 for providing a clock signal to the encoder 42, under the control of the main processor 22.

Duplicated constituents between the second embodiment above and the first embodiment in FIG. 3 are marked with the same reference numerals, and their operational description will be omitted. What is modified is the process of transforming the data that is transmitted from a service provider to the modem 24 into a composite video signal appropriate to CRT display. For this process the data I/O section 25 reads the data inputted to the modem 24 and outputs it to the line memory 40 through the bus buffer 31.

However, since the data that is inputted to the line memory 40 has a frequency f which is fit exclusively for scanning method for a computer monitor, i.e., sequential scanning, it is not appropriate to a TV CRT. Accordingly, the line memory 40 alters the data of frequency f to the data of frequency f/2 which is appropriate to interlaced scanning for a TV that scans electron beams every two lines. Thus a CRT can represent a distinct picture. The digital-to-analog converter 41 converts into an analog the data from the line memory 40, and the encoder 42 transforms the analog converted data into a composite video signal and provides it to one input of the switching section 13. In the mean time, the clock generator 43 provides a clock signal of a given period to the encoder 42, under the instruction of the main processor 22. By doing so, the data that is received by the modem 24 can be displayed on the CRT 30.

Figure 5:
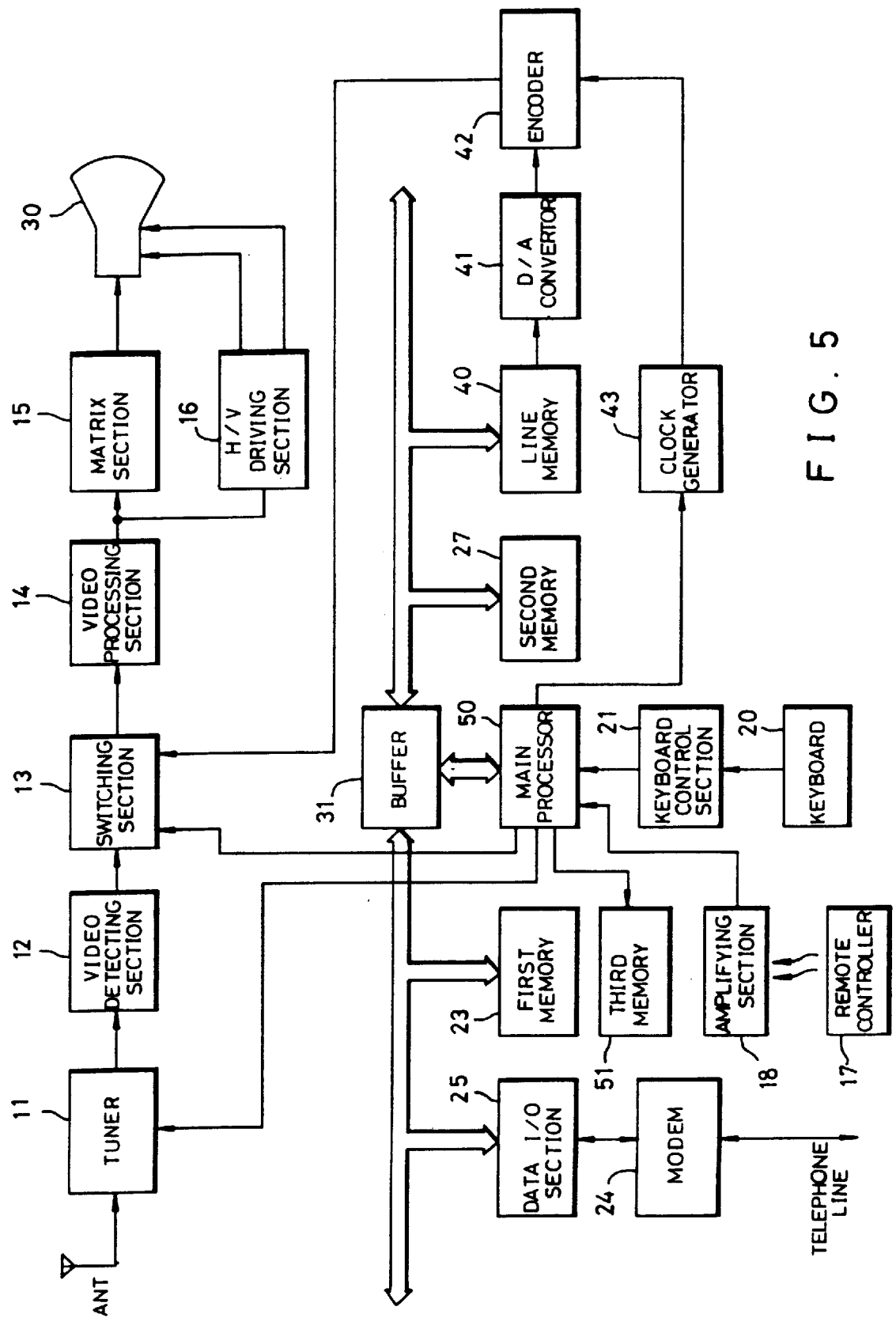
FIG. 5 is a block diagram of a third embodiment of the communication control device for a TV according to the present invention.

FIG. 5 shows a third embodiment of the present invention. The afore-mentioned video interface means for this embodiment is similar to that of the second embodiment, while the control means is rather different. In the second embodiment, control is performed separately both with the microcomputer 19 and with the main processor 22. In this third embodiment, control is performed collectively with a main processor 50. The main processor 50 controls the tuner 11, the switching section 13, input and output of the communication data, and video processing, in response to a TV operation instruction from the amplifying section 18 and a communication mode instruction from the keyboard control section 21. A third memory 51 here is a memory that stores a program relating to broadcasting signal selection. Description of other constituents will be omitted by marking the same reference numerals as those of the first and second embodiments.

As the function of the main processor 50 for this embodiment organized as shown in FIG. 5, instruction which is transmitted from the remote controller 17 is provided to the main processor 50 after amplified in the amplifying section 18. The main processor 50. analyzes the inputting function selection signal and, if a TV mode, controls the tuner 11 and the other sections for TV operation, with a program stored in the third memory 51. If a computer communication mode is checked, the main processor 50 allows the switching section 13 to select a video signal from the encoder 42 and controls the computer communication operation using the modem 24.

Figure 6:
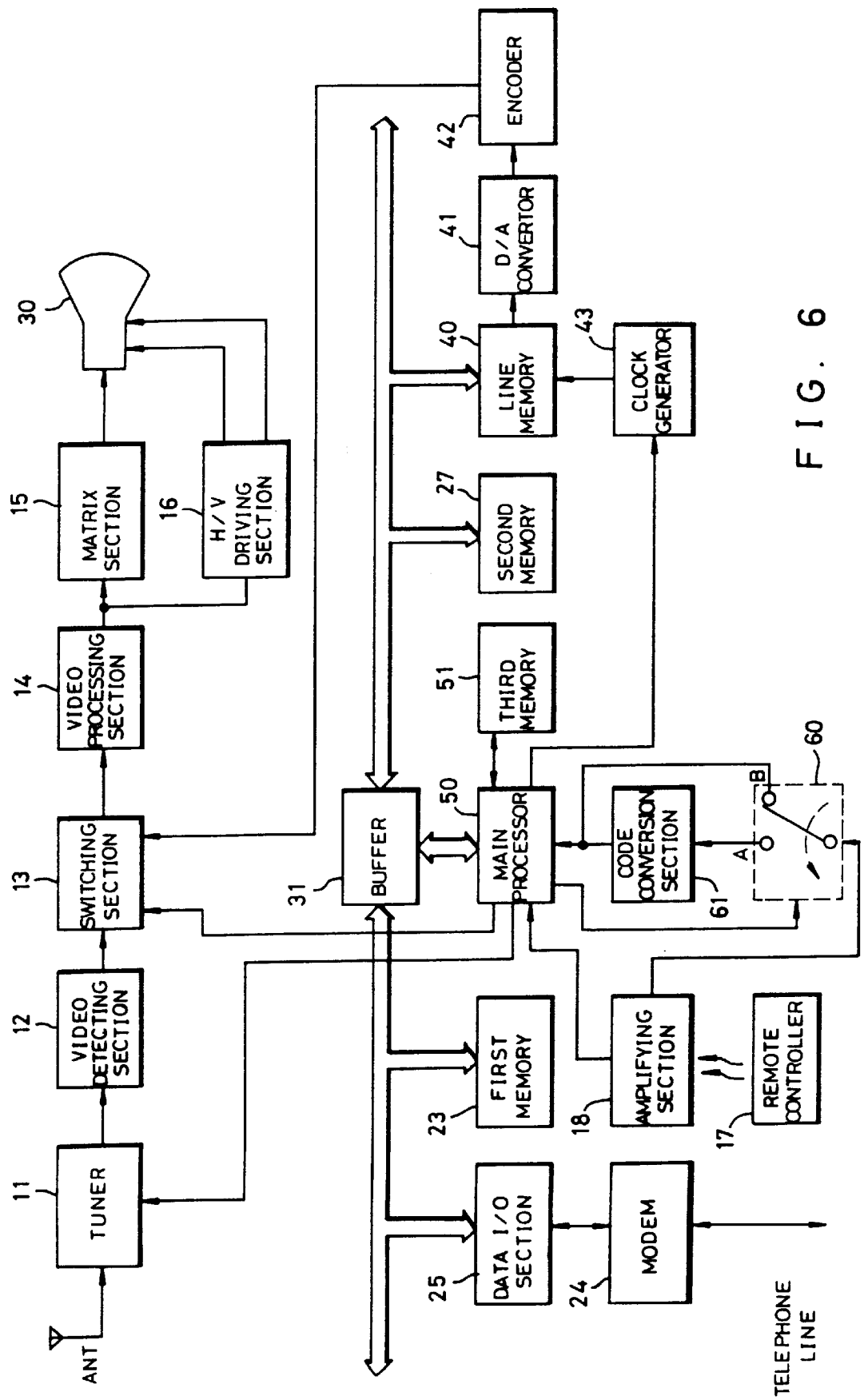
FIG. 6 is a block diagram of a fourth embodiment of the communication control device for a TV according to the present invention.

FIG. 6 shows a fourth embodiment of the present invention. The afore-mentioned control means is integrated for this embodiment into the one main processor 50, as is in the third embodiment. The key input means, which has been constituted in the first to third embodiments by the keyboard 20 and the keyboard control section 21, is now implemented by the sole remote controller 17. What is newly added is a code conversion section 61 for dividing a signal transmitted from the remote controller 17 into two signals, a TV control instruction and data and a communication control instruction and data, and converting into a key code the communication control instruction and data; and a key input switching section 60 for switching either the TV control instruction and data from the remote controller 17 or the key code converted by the code conversion section 61.

Duplicated constituents between this embodiment and the first to third embodiments are marked with the same reference numerals, and their operational description will be omitted. For this embodiment the keyboard 20 is not used and, instead, the TV and communication functions are performed only with the remote controller 17. What follows is the operation.

If a function selection signal is transmitted by a user's manipulation from the remote controller 17, the amplifying section 18 amplifies the function selection signal and provides the amplified signal to the main processor 50 and the key input switching section 60. At this time, since a contact B in the key input switching section 60 remains closed until a switching control signal is provided from the main processor 50, the function selection signal is directly provided to the main processor 50 rather than through the code conversion section 61.

The main processor 50 analyzes the function selection signal from the amplifying section 18. If a TV mode is checked, it controls broadcasting-signal receiving sections including the tuner 11 so as to receive TV broadcasting signals, and switches the switching section 13 towards the video detecting section 12 in order to process a TV operation; if a computer communication mode is checked, the main processor 50 switches the switching section 13 towards the encoder 42 which outputs a communication video signal, and provides a switching control signal to close a contact A in the key input switching section 60. Therefore, the communication mode selection signal from the amplifying section 18 can be provided through the key input switching section 60 to the code conversion section 61. The code conversion section 61 converts the inputting signal into an ASCII code, allowing the main processor 50 to control a computer communication operation, as in the first to third embodiments. For example, if a user strikes a "Z" key of the remote controller 17, the code conversion section 61 provides to the main processor 50 an ASCII code "122" corresponding to "Z". Thus the main processor 50 can recognize "Z" from "122". Therefore, the micro processor 50 can accomplish a computer communication, under the user's instruction which is transmitted through the remote controller 17.

Figure 7:
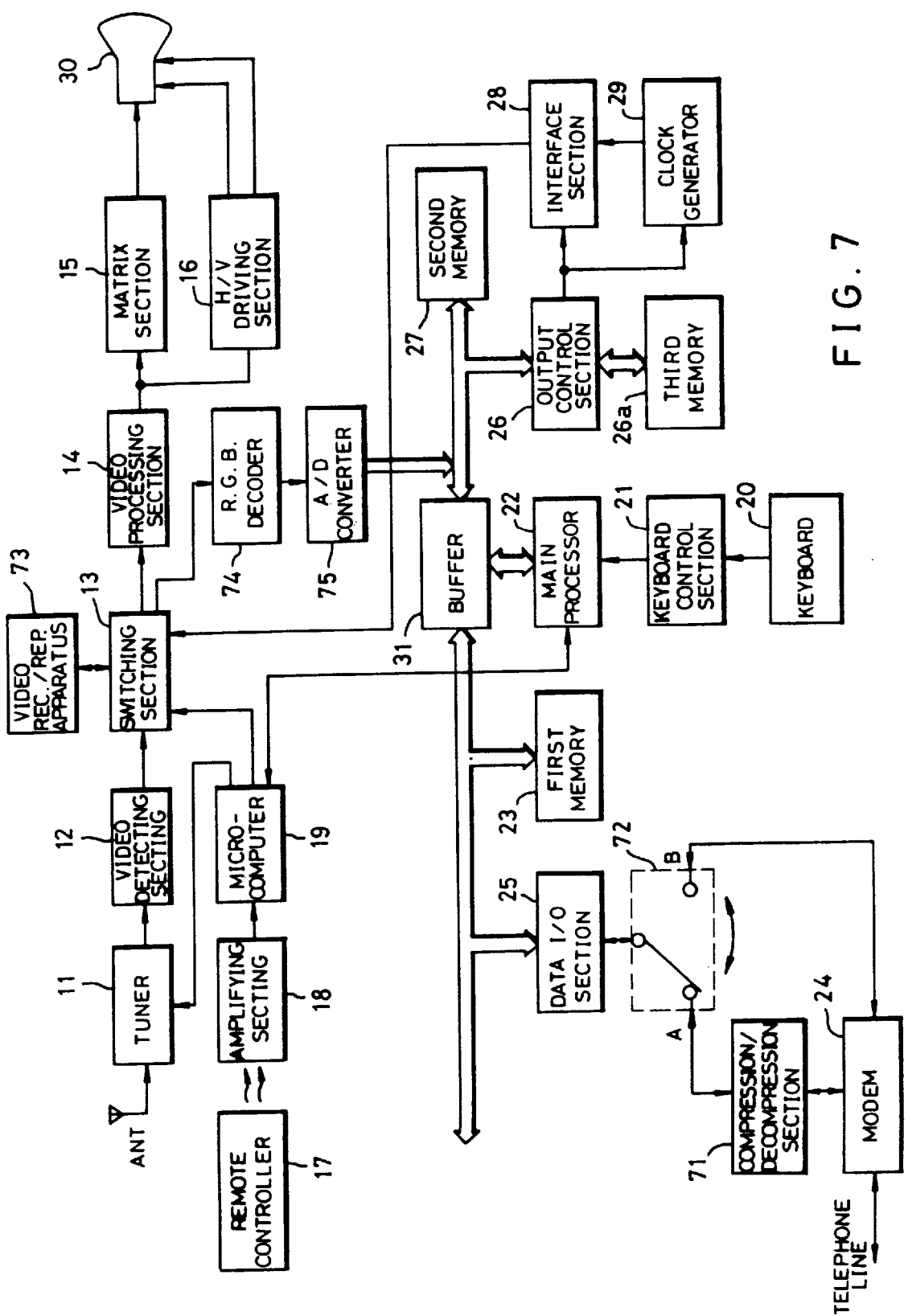
FIG. 7 is a block diagram of a fifth embodiment of the communication control device for a TV according to the present invention.
Figure 8:
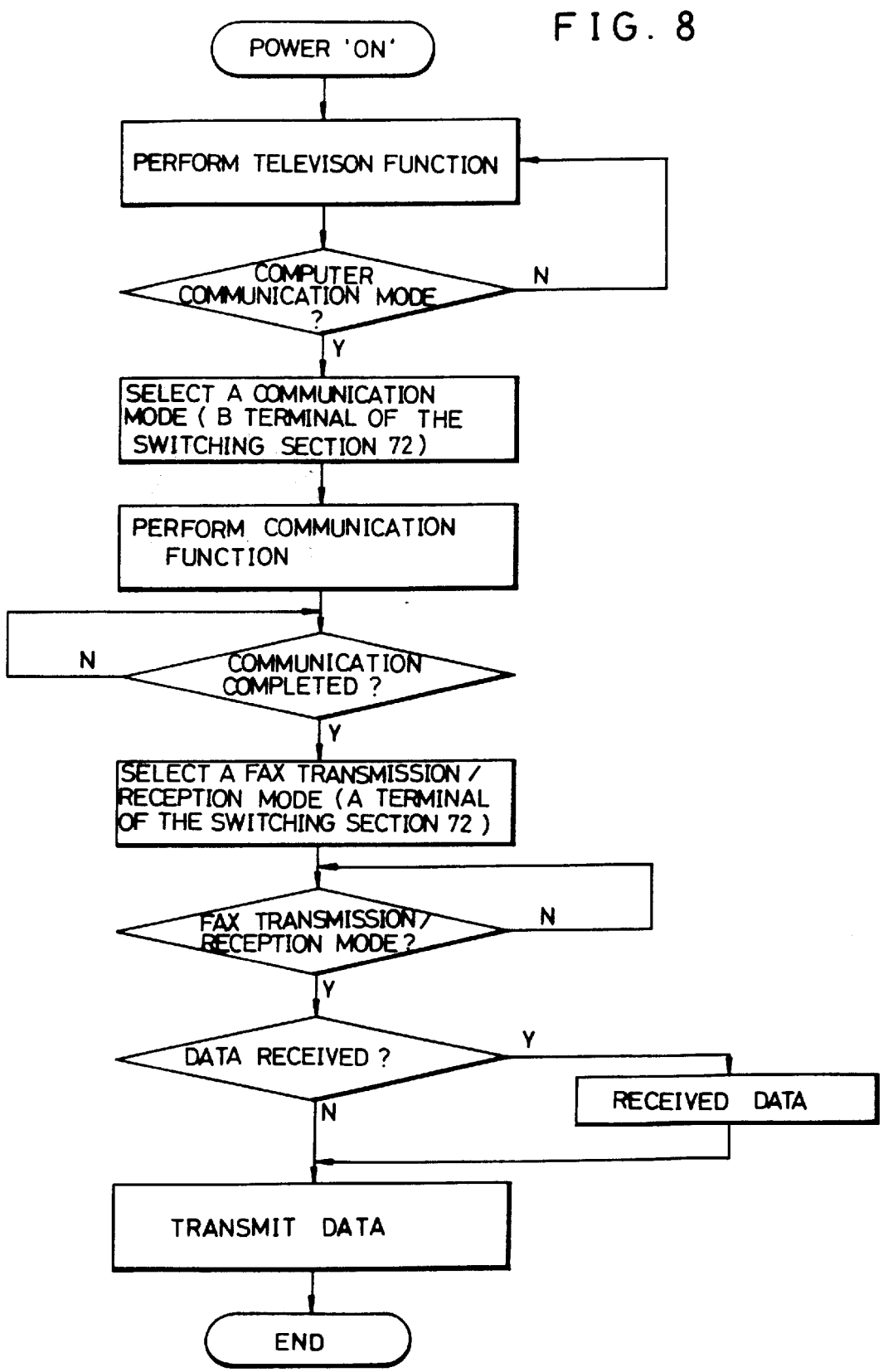
FIG. 8 is a flow chart explaining the communication control method for a TV according to the present invention.

FIG. 7 shows a fifth embodiment of the present invention. This embodiment is about a TV capable of facsimile operation. FIG. 8 is a flowchart that shows an operational process of this fifth embodiment. This embodiment includes a data compression/decompression section 71 for decompressing the data received in a facsimile data format and/or compressing the data to be transmitted into a facsimile data format; and a facsimile/computer communication switching section 72 for switching a facsimile transmission and reception mode and a computer communication mode.

Further, this embodiment employs an R-G-B decoder 74 for decoding an external analog image signal into an R-G-B signal; and an analog-to-digital converter 75 for converting the output signal of the R-G-B decoder into a digital. The output of the analog-to-digital converter 75 is provided through the facsimile/communication switching section 72 to the data compression/decompression section 71, such that a facsimile data can be transmitted.

Still further, this embodiment adopts a switching section 13 whose operation is different from that in the previous embodiments. This switching section 13 passes a facsimile data, which is received via the modem 24 and the data compression/decompression section 71, to the video interface means, so that the facsimile data is transformed into a TV video signal. In addition, it reciprocates data with an external video recording/reproducing apparatus 73 (e.g., a VCR) to record the facsimile data.

Duplicated constituents between this embodiment and the previous first to fourth embodiments are marked the same reference numerals. The operation of this embodiment will be considered function by function. Refer to a block diagram in FIG. 7 and a flowchart in FIG. 8.

First, since a TV operation is similar to the first to fourth embodiments, its description will be briefed. Instruction that a user selects with the remote controller 17 is amplified by the amplifying section 18. According to the instruction, the microcomputer 19 controls the tuner 11 for channel selection and the switching section 13 for selecting the video detecting section 12. By doing so, the selected channel is displayed on the CRT 30.

As to a computer communication mode, if a user initiates with the remote controller 17 a communication mode, the microcomputer informs the micro processor 22 that a mode should be changed into a computer communication mode. The switching section 13 is accordingly switched to an interface section 28 side, and, from then on, the main processor 22 supervises each sections. As a first operation, the processor 22 switches the facsimile/communication switching section 72 from a contact A to B.

If a mode is changed like the foregoing into a computer communication mode, a user can reach through a modem and a telephone line a services provider's database. The keyboard control section 21 converts into an ASCII code the data that a user enters with the keyboard 21, such as a service name, a user name, and an ID number. The main processor 22 transfers through the bus buffer 31 the ASCII-converted data to the data I/O section 25, using a program stored in the first memory 23. The data I/O section 25 transfers the data from the main processor 22 to the modem 24, through the facsimile/communication switching section 72 in which a contact B is closed. Then the modem 24 transmits, after modulation, the data through a telephone. A database at a service side analyzes the data travelling through a telephone line, and, if the data meets requirements, transmits a user-requested service through a telephone line. Then the data I/O section 25 reads the service information which is demodulated at the modem 24 and inputted through the switching section 72, thereafter storing through the bus buffer 31 the information in the second memory 27.

At this time, the output control section 26 detects pixel data from the service information stored in the second memory 27 and transfers the pixel data to the interface section 28, under the control of the main processor 22. The interface section 28 transforms the inputting pixel data into a composite video signal appropriate to CRT display, and provides the video signal, in synchronism with a clock signal from the clock generator 29, to the switching section 13. The switching section 13 transfers the video signal from the interface section 28 to the video processing section 14. As a result, a service information from a service provider is visualized by a CRT.

If a user who has been reading the service information gives, using the keyboard 20, the main processor 22 a storage instruction to put the favorite information aside in memory, the aiming information can be stored in the third memory 26a. If necessary, a user can transmit data which is stored in each memory through the modem 24.

If a user strikes an end key of the remote controller 17 to finish a computer communication, the main processor 22 switches again the switching section 72 to a contact A.

The following is about a facsimile reception mode. The modem 24 receives the facsimile data that is compressed with an MR, MH, or MMR signal and transmitted from other facsimile machines, and transfers the facsimile data to the data compression/decompression section 71. The data compression/decompression section 71 decompresses (restores) the facsimile data and transfers it through the contact A in the facsimile/communication switching section 72 to the data I/O section 25. The data I/O section 25 stores through the bus buffer 31 the restored facsimile data in the second memory 27.

The output control section 26 detects pixel data from the facsimile data stored in the second memory 27 and transfers the pixel data to the interface section 28, under the control of the main processor 22. The interface section 28 transforms the inputting pixel data into a composite video signal appropriate to CRT display, and provides the video signal, in synchronism with a clock signal from the clock generator 29, to the switching section 13. The switching section 13 transfers the video signal from the interface section 28 to the video processing section 14. Then the video processing section 14 processes the composite video signal to visualize on a CRT.

If necessary, the facsimile data received by the modem 24 can be put aside in the third memory 26a. Connecting the switching section 13 with an external video appliances 73 (e.g., a VCR), the facsimile message, which is transformed by the interface section 28 into a composite video signal, can be recorded on or reproduced from a videotape or other media.

In facsimile transmission, if a user prepares with the keyboard 20 an original to be sent, content of the prepared original is stored in the second memory 27, under the control of the main processor 22. The transmission data stored in the second memory 27 is transferred through the bus buffer 31 to the data I/O section 25. The data I/O section 25 transfers the inputting transmission data through the contact A in the switching section 72 to the data compression/decompression section 71. The data compression/decompression section 71 compresses the transmission data with an MR, MH, or MMR signal and provides it to the modem 24. Then the modem 24 transmits the compressed facsimile data through a telephone line to other sides.

In case that a user wants to transmit a message which is stored in an external video appliance 73, the switching section 72 is switched to the external appliance 73 side and the R-G-B decoder 74 side. Accordingly, data outputted from the external appliance 73 is provided through the switching section 13 to the R-G-B decoder 74. The decoder 74 decodes luminance and color signal data outputted from the external appliance 73 into an R-G-B signal. The analog-to-digital converter 75 converts the analog type R-G-B signal into a digital and stores it the second memory 27. Then the data I/O section 25 reads out the final transmission data stored in the second memory 27 and transfers it through the contact A in the switching section 72 to the data compression/decompression section 71. The data compression/decompression section 71 compresses and transmits the transmission data.

The control method for a TV according to this embodiment will be briefed with reference to FIG. 8 as follows. When powered on, the TV operates ordinarily. If a user chooses a computer communication mode, the facsimile/communication switching section 72 is switched to the B-contact, thereby performing a communication operation. If facsimile transmission and reception modes are chosen after a computer communication mode, the facsimile/communication switching section 72 is switched again to the A-contact, thereby performing a facsimile operation. At this time, control accepts reception data prior to transmission data so that reception is performed preferentially to transmission.

From the foregoing, by implementing to a TV the functions of facsimile transmission/reception and computer communication, a user can enjoy the computer communication without a computer or an exclusive terminal, and send a facsimile message which is prepared by a TV or read out from a VCR, etc. without a facsimile machine. In addition, received facsimile data can be put aside in an external VCR or the like. Therefor, equipments, which must be conventionally prepared for each use, can be integrated into one. While specific embodiment of the present invention has been shown and described, further modifications and improvements will occur to those skilled in the art. All such modifications which retain the basic underlying principles disclosed and claimed herein are within the scope of this invention.

What is claimed is:

1. A communication control device for a television receiver comprising:

a television/communication switching section adapted to select one of an image signal of a television broadcasting channel and a television communication image signal for computer communication, wherein each of the image signal of a television broadcasting channel and the television communication image signal comprises a composite video signal appropriate to television display;

key input means for manually inputting a key signal for performing the computer communication;

a controller adapted to control the operation of said television/communication switching section and controlling transmission and reception for the computer communication in accordance with the key signal from said key input means;

a modem, connected to an external communication line, for modulating and demodulating communication information to be transmitted and received;

data memory for storing the communication data being inputted through said modem and outputting the stored communication data under the control of said controller; and an image interface adapted to convert the communication data received through said modem or the data stored in said data memory into the television communication image signal under the control of said controller, and further adapted to output the television communication image signal to a television screen through said television/communication switching section, said image interface including a line memory for converting the input data of frequency f suitable for sequential scanning into an output signal of frequency f/2 suitable for interlaced scanning, a digital-to-analog converter for converting the output signal of said line memory into an analog signal, an encoder for converting an output signal of said digital-to-analog converter into a composite video signal, and a clock generating section for providing a clock signal to said encoder.

2. A communication control device as claimed in claim 1, further comprising:

a data compression/decompression circuit, connected to said modem for decompressing data received in a facsimile data format or compressing the communication data to be transmitted in the facsimile data format;

a facsimile/communication switch adapted to switch said data compression/decompression circuit according to a facsimile transmission and reception mode or a computer communication mode under the control of said controller.

3. A communication control device as claimed in claim 2, further comprising:

an R, G, and B decoder for decoding an external analog image signal into R, G, and B signals; and an analog-to-digital converter for converting said R, G, and G signals into a digital signal;

wherein an output signal of said analog-to-digital converter is inputted to said data compression/decompression circuit through said facsimile/communication switch so that an output signal of said data compression/decompression circuit is transmitted as facsimile data.

4. A communication control device as claimed in claim 1, further comprising:

a code converter for classifying the input signal from said key input means into commands for television control and commands and data for communication control, and converting the commands and data for communication control into key codes; and a key input switch for selecting and outputting one of the commands for television control and the key codes converted by said code converter to said controller under the control of said controller.

* * * * *